United States Patent [19]
Lee

[11] Patent Number: 5,727,425
[45] Date of Patent: Mar. 17, 1998

[54] METHOD FOR ADJUSTING A THROTTLE VALVE CABLE IN AN AUTOMATIC TRANSMISSION

[75] Inventor: Edward Lee, Newark, Del.

[73] Assignee: Deltrans Inc., Newark, Del.

[21] Appl. No.: 761,652

[22] Filed: Dec. 6, 1996

Related U.S. Application Data

[60] Division of Ser. No. 523,411, Sep. 5, 1995, Pat. No. 5,638,721, which is a continuation-in-part of Ser. No. 511,409, Aug. 4, 1995, abandoned.

[51] Int. Cl.$^6$ .................................................... F16C 1/10
[52] U.S. Cl. .................................. 74/500.5; 74/501.5 R; 74/502.4; 74/502.6
[58] Field of Search ........................... 74/501.5 R, 502.6

[56] References Cited

U.S. PATENT DOCUMENTS

| | | | |
|---|---|---|---|
| 3,710,642 | 1/1973 | Schneider | 74/470 |
| 3,731,667 | 5/1973 | Mac Millan | 123/198 DB |
| 3,842,810 | 10/1974 | Yagi et al. | 123/274 |
| 3,901,610 | 8/1975 | Mason | 403/78 |
| 3,903,679 | 9/1975 | Sorenson et al. | 56/11.6 |
| 4,210,110 | 7/1980 | Krebaum et al. | 123/319 |
| 4,778,161 | 10/1988 | Douillet | 267/179 |
| 4,869,123 | 9/1989 | Stocker | 74/501.5 R |
| 4,875,384 | 10/1989 | Hirayama et al. | 74/500.5 |
| 4,881,423 | 11/1989 | Troiano | 74/501.6 |
| 4,938,304 | 7/1990 | Yamaguchi et al. | 180/197 |
| 5,046,380 | 9/1991 | Matsumoto et al. | 74/502.4 |
| 5,174,170 | 12/1992 | Kato et al. | 74/502.6 |
| 5,295,408 | 3/1994 | Nagle et al. | 74/502.6 |
| 5,542,313 | 8/1996 | McCarthy | 74/502.6 X |

FOREIGN PATENT DOCUMENTS

| | | |
|---|---|---|
| 31 35 450 | 4/1983 | Germany . |
| 2 060 809 | 5/1981 | United Kingdom . |

*Primary Examiner*—Vinh T. Luong
*Attorney, Agent, or Firm*—Connolly and Hutz

[57] ABSTRACT

In a motor vehicle automatic transmission, for example, a GENERAL MOTORS THM 700-R4 automatic transmission, the throttle valve cable ("T.V. cable") forms part of the mechanical link between the throttle pedal, the throttle valve linkage on a fuel delivery system (e.g., a carburetor or electronic fuel injector) and the throttle valve. In the method of adjusting the throttle valve cable disclosed in this application, a sleeve and spring are installed at the distal end of the T.V. cable, between the cable end clamp and the tear-drop shaped cable end fitting on the T.V. cable. The spring opposes the movement of the cable end fitting toward the distal end of the T.V. cable so that the cable end fitting is at its maximum distal position only at fully open throttle. This gives the vehicle operator the shift feel of a shorter T.V. cable at most throttle openings. The sleeve and spring are installed only on T.V. cables in automatic transmissions that do not have T.V. cable end fittings permanently attached to a throttle cam.

8 Claims, 1 Drawing Sheet

1

METHOD FOR ADJUSTING A THROTTLE VALVE CABLE IN AN AUTOMATIC TRANSMISSION

CROSS-REFERENCES TO RELATED APPLICATIONS

This application is a division of application Ser. No. 08/523,411, filed Sep. 5, 1995, now U.S. Pat. No. 5,638,721 which in turn is a continuation-in-part of application Ser. No. 08/511,409, filed Aug. 4, 1995, now abandoned.

BACKGROUND OF THE INVENTION

Many automatic transmissions include a throttle valve cable ("T.V. cable") that forms a mechanical link between the motor vehicle fuel delivery system and the transmission. A throttle lever and bracket assembly transfers the movements of the throttle plates in the fuel delivery system (such as a carburetor or an electronic fuel injector) to a throttle valve plunger in a throttle valve valve body. Throttle valve pressure and line pressure increase according to the throttle opening. The throttle lever and bracket assembly also control modulated and detent downshifts.

If the throttle valve ("T.V. cable") is properly adjusted, the throttle valve plunger is fully depressed when the engine is at wide open throttle. With proper adjustment of the T.V. cable, the movement of the throttle valve plunger in the throttle valve valve body is calibrated to the movement of the fuel delivery system. The transmission should have the correct oil pressure and shift feel regardless of engine torque. When properly calibrated, the engine torque and transmission line pressure/shift feel should always be in balance.

Factory settings for the throttle valve cable usually require that (1) the distance between the distal end of the T.V. cable be at most about 1.125 inches from the pivot point of the throttle shaft linkage, and (2) the distal end of the T.V. cable travels no more than an angle of about 78 degrees (measured from the pivot point of the throttle shaft linkage) from closed throttle to wide open throttle. The proximal end of the T.V. cable is located closer to the throttle pedal. On some vehicles, the distance from the pivot point to the attachment point for the T.V. cable is greater than the recommended setting. In others, the angle of travel is greater. In each instance, the T.V. cable will be longer than recommended at wide open throttle.

The length of the throttle valve cable is critical to proper transmission shift performance. If the T.V. cable is shortened by moving it towards an adjuster tab on the T.V. cable housing, both line pressure and shift points will be raised. However, the effect is usually only temporary. When the driver depresses the throttle to the full throttle position, the T.V. cable will readjust to its approximate normal position and length. The T.V. cable adjuster will ratchet out when subject to a pulling force of about 18 pounds.

Alternatively, if the throttle valve cable is lengthened, both line pressure and shift points are lowered. Under this lengthened condition, the T.V. cable will not readjust when the throttle is depressed to the full throttle position. Thus, the effect is to allow engine torque to be ahead of transmission line pressure and shift points. Early shifts, slipping and/or no detent downshifts may occur. In addition, transmission line pressure will be low. Operating the vehicle with a longer T.V. cable causes premature clutch wear and other transmission malfunctions.

Many vehicle owners would like to defeat the self-adjusting throttle valve cable and tailor shift points or shift feel. However, on most vehicles, and especially on a vehicle with a GENERAL MOTORS THM 700-R4 automatic transmission, the T.V. cable controls both shift feel (clutch apply pressure) and shift points. One cannot alter one without altering the other. A self adjusting T.V. cable that could be set to a predetermined shorter length to raise line pressure and shift points, but that could also "adjust" itself to a longer length when the vehicle is operated at full throttle would solve these problems. Accordingly, it is an object of the present invention to have a method and an apparatus to adjust the shift performance of an automatic transmission without adjusting the predetermined length setting of the T.V. cable.

SUMMARY OF THE INVENTION

Automatic transmissions for motor vehicles have a throttle valve cable ("T.V. cable") that is part of the mechanical link between the throttle pedal, the throttle valve linkage on the fuel delivery system (such as a carburetor or an electronic fuel injector), and the throttle valve. The T.V. cable has a tear drop-shaped cable end fitting attached at or near the distal end of the T.V. cable. The cable end fitting is slidable with relation to the T.V. cable and is attached to the throttle valve linkage on the fuel delivery system at a point spaced apart from the pivot point on the throttle valve linkage.

To improve transmission shift performance at all throttle positions, a sleeve is mounted to the throttle valve cable ("T.V. cable") at or near the distal end of the cable. In addition, a spring is mounted on the T.V. cable, preferably between the cable end fitting and the sleeve. The sleeve has a flange with an effective outer diameter that is greater than the effective outer diameter of the spring. The sleeve preferably has an open axially aligned channel and an open axially aligned bore through which the T.V. cable is positioned. The end clamp of the T.V. cable fits within all or a portion of the bore in the sleeve.

If the spring is a coil spring, it is preferably formed of 0.034 to 0.035 gauge wire stock and has a length of between about 0.3 to 0.8 inches, preferably 0.6 to 0.7 inches, and has about 6 to 8 spring coils. The spring force should be within the range of about 5 to 7 psi, preferably about 6.5 psi. When fully compressed, the spring should have a spring length of no more than between about 0.1 and 0.3 inches.

When a coil spring is used, the sleeve may be provided with an annular ring projecting from its outer surface and spaced apart from the flange. The annular ring should have a diameter that is at least slightly greater than the inner diameter of the coils of the coil spring. One or more coils at one end of the spring may then be placed or snapped over the annular ring and held between the flange and the annular ring on the sleeve to retard relative movement between the spring and the sleeve.

For vehicles with an after-market throttle valve cable ("T.V. cable") that has a barrel type stop at the distal end of the cable, as opposed to a clamp, the barrel stop does not fit within the axially aligned bore of the sleeve. Nevertheless, when the barrel stop is adjacent to the sleeve, it fits partially within a saddle-shaped cut in the surface of the flange of the sleeve.

BRIEF DESCRIPTION OF THE DRAWINGS

FIG. 4 is a rear elevational view of the T.V. cable adjustment combination of FIGS. 2 and 3 showing the spring in phantom outline;

DESCRIPTION OF THE PREFERRED EMBODIMENTS

Figure 1:
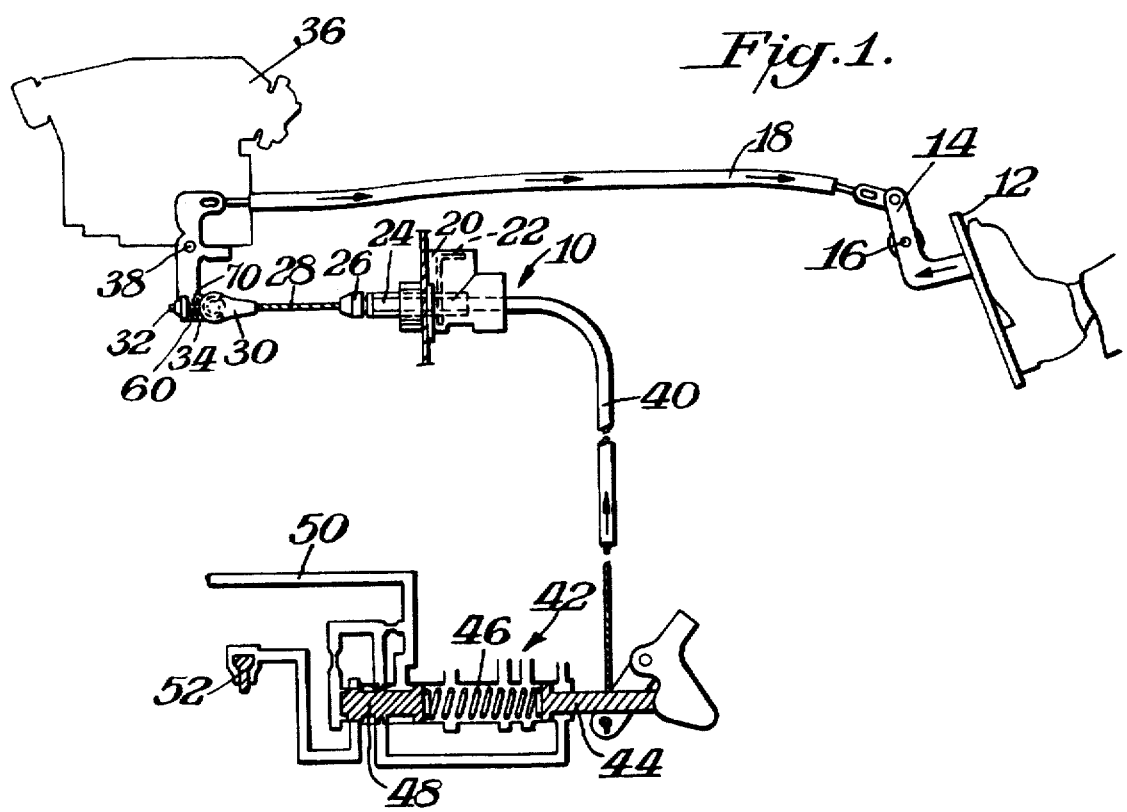
FIG. 1 is a schematic diagram showing the operation of a motor vehicle transmission including an accelerator, a fuel delivery system (e.g., carburetor or electronic fuel injector), a throttle valve and a throttle valve cable ("T.V. cable") with the self-adjusting sleeve and spring combination of the present invention.

FIG. 1 is a schematic diagram of a THM 700-R4 HYDRA-MATIC automatic transmission provided in several models of GENERAL MOTORS automobiles. The elements of the transmission 100 shown in this schematic are the accelerator or throttle pedal, the throttle cable, the throttle valve cable ("T.V. cable"), the carburetor and the throttle valve. In summary, when the operator of the motor vehicle depresses the accelerator or throttle pedal 12, the cable activator 14 pivots about pivot 16 to pull the throttle cable 18. The throttle cable 18 in turn acts on one end of the linkage 34 on the fuel delivery system or carburetor 36. A tear drop-shaped movable cable end fitting 30 is provided at or near the distal end of the T.V. cable 28. The cable end fitting 30 attaches or links to the other end of the linkage 34 mounted on the carburetor 36. This linkage acts through T.V. cable 28 and cable 40 on the plunger 44 of the throttle valve 42. A self-adjusting T.V. cable housing 20 is positioned between linkage 34 and plunger 44.

For the embodiment of the invention shown in FIGS. 1-5, throttle valve pressure is related to carburetor opening, which is in turn related to engine torque. The system has a direct, straight line mechanical relation between the carburetor throttle plate opening and the transmission throttle plunger 48 movement. As the accelerator pedal 12 is depressed and the carburetor 36 opened, the throttle valve cable ("T.V. cable") 28 (a mechanical linkage) relays the movement to the throttle valve plunger 44 and increases the force of the throttle valve spring 46 against the throttle valve 42. Throttle valve pressure increases within the 0 to 90 psi range. Throttle valve oil is directed through the throttle plunger 48 to provide a hydraulic assist to reduce the throttle pedal force necessary to actuate the plunger. A throttle valve feed 50 supplies throttle valve oil to the throttle valve 42. An exhaust 52 is provided from the throttle valve 42.

As shown in FIG. 1 the self adjusting throttle valve cable housing 20 includes an adjustment tab or lever 22 that may be depressed when changing the predetermined set length of the cable 40 or throttle valve cable ("T.V. cable") 28. As stated earlier, if the T.V. cable length is set too short, in the absence of the sleeve and spring combination of the present invention, the T.V. cable will automatically lengthen when the vehicle is at open throttle and the cable is subject to a force of 18 psi or greater. The self adjusting throttle valve cable housing 20 is provided with a slider 24 and a stop 26. T.V. cable length may be manually adjusted by exposing more or less of the slider 24 from the housing 20. During vehicle operation, when pressure and load on the T.V. cable are great at open throttle, however, the slider 24 will automatically ratchet out to a new set position, extending further from the housing 20.

Figure 2:
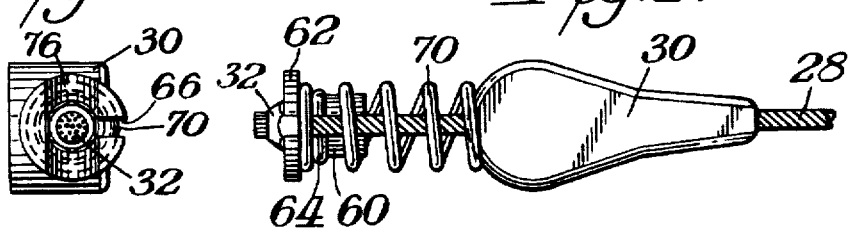
FIG. 2 is a side elevational view of the T.V. cable end fitting and the T.V. cable adjustment combination of the invention.

According to the present invention, to maintain the shift feel and shift points over a greater range of engine throttle conditions, a slidable or moveable sleeve 60 and a spring 70 are provided adjacent to the cable end fitting 30 of the throttle valve cable ("T.V. cable") 28. As shown in FIG. 2, the T.V. cable 28 has a distal end that is crimped and held by a cable clamp 32. Preferably, the slidable sleeve 60 is positioned adjacent to the cable clamp 32 and one end of the spring 70 is placed next adjacent to the sleeve 60 with the other end of the spring adjacent to the cable end fitting 30.

Preferably, the spring is a coil spring with six to eight coils with an inner diameter of about 0.25 inch, and with a length in the range of between about 0.3 to 0.8 inches. Most preferably, the spring will be about 0.62 to 0.63 inches long in an uncompressed state. The preferred spring has a spring force of between about 5 and 7 psi, most preferably about 6 to 6.5 psi. When fully compressed, the spring should have a length of not more than about 0.1 to 0.3 inches. The slidable sleeve 60 is preferably formed so that one end of the spring 70 may be removably attached.

Figure 3:
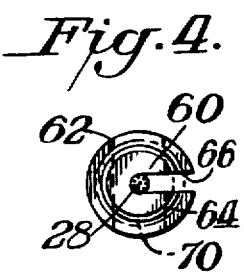
FIG. 3 is a front elevational view of the T.V. cable adjustment combination of FIG. 2.

The preferred slidable sleeve 60 is substantially cylindrical with a hollowed center and has a flange 62 at one end. The bottom surface of the sleeve 60, which corresponds to the bottom surface of the flange 62, may be substantially flat, but is shown in FIGS. 3 and 4 with a saddle-shaped curved cut out portion 76. The sleeve 60 fits over the throttle valve cable ("T.V. cable") 28 and may slide relative thereto. The flange is formed with an effective outer diameter that is greater than the effective outer diameter of the spring 70, which may be the outer diameter of the coils of a coil spring. The outer surface of the sleeve 60 may also have a raised annular ring 64 spaced a distance apart from the flange 62. One or more coils from the coil spring 70 may fit between the flange 62 and the annular ring 64 to removably connect the spring 70 to the sleeve 60 and prevent relative movement between the spring and the sleeve. When the annular ring is provided, the spring coil(s) may be snapped over that ring and fit into place between the flange and the ring.

Figure 5:
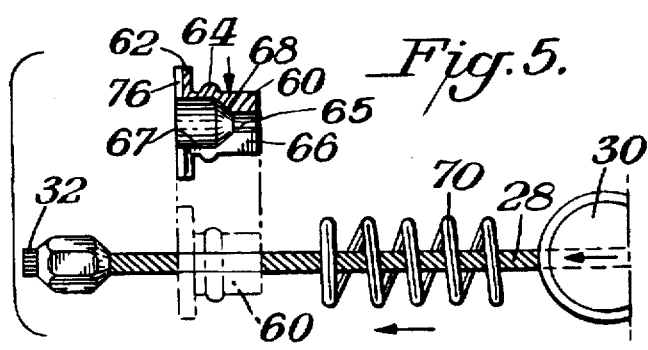
FIG. 5 is an exploded side elevational view showing the sequence for assembling the T.V. cable adjustment combination.

As shown best in FIG. 5, the sleeve 60 is provided with an axially aligned, bored inner cavity 68 comprising channel 65 and wider bore 67 at one end. The inner cavity 68 may be wide enough at the bored end of the sleeve so that the cable clamp 30 may fit within the bored portion of sleeve.

The sleeve 60 is also provided with a longitudinal slot 66 that is cut through the sleeve to the inner cavity 68 (FIG. 4). As shown in FIG. 5, to install the invention on to the throttle valve cable ("T.V. cable"), the spring may first be placed over or wrapped around the T.V. cable. Next, the sleeve may be installed onto the T.V. cable by first placing the sleeve 60 adjacent to the T.V. cable so that the T.V. cable 28 may be inserted into the slot 66 and then by pressing the sleeve toward the cable until the T.V. cable 28 is held within the axially aligned inner cavity 68 through the sleeve 60. Ira coil spring is used, one or more coils at one end of the spring may be snapped or fitted over the annular ring 64 of the sleeve 60.

Figure 6:
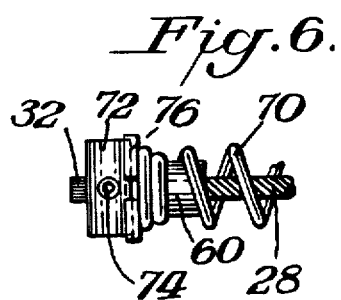
FIG. 6 is a side elevational view of the T.V. cable adjustment combination installed on an alternate throttle valve cable embodiment with a barrel stop at its distal end.

Certain after-market T.V. cables are provided with a barrel stop 72 that is held on the distal end of the cable by tightened screw 74. These cables do not have a cable clamp. The self-adjusting sleeve and spring combination of the invention may be installed on such after-market T.V. cables. As shown in FIG. 6, the sleeve 60 is placed adjacent to the barrel stop 72 and the spring 70 is then placed next adjacent the sleeve 60. The barrel stop 72 partially fits within the saddle-shaped cut-out portion 76 in the sleeve 60. The sleeve 60 and spring 70 remain slidable with relation to the T.V. cable 28 and the barrel stop 72.

When the invention is installed on a throttle valve cable ("T.V. cable") in an automatic transmission, the shift performance thereby is "adjusted" without changing the predetermined length setting for the T.V. cable. In other words, the vehicle operator will have the shift feel of a shorter T.V. cable at most throttle openings. Even if the T.V. cable has already "self-adjusted" to its less desired longer length, the spring will oppose the movement of the cable end fitting toward the distal end of the T.V. cable at most throttle positions. At open throttle, however, the cable and fitting will be forced against the end of the spring and fully compress the spring. The spring modulates the movement of the cable and fitting so that it is at its maximum distal position only at fully open throttle. Consequently, the throttle valve plunger is fully depressed only when the engine is at wide open throttle. The transmission has the correct oil pressure and shift feel regardless of engine torque and remains in balance over a wider range of operating conditions.

As will be readily apparent to those skilled in the art, the invention may be used in other specific forms without departing from its spirit or essential characteristics. The present embodiments are illustrative and not restrictive. The scope of the invention is indicated by the following claims.

I claim:

1. A method for adjusting the shift performance of an automatic motor vehicle transmission that has a throttle valve cable with a proximal end and a distal end forming a mechanical link between a throttle pedal, a throttle valve linkage on a fuel delivery system, and a throttle valve, wherein the throttle valve cable has a cable end fitting attached to the throttle valve linkage at a distance from a pivot point on the throttle valve linkage and the throttle valve cable is held within a cable housing provided with a means for adjusting the throttle valve cable to a predetermined length, comprising:

mounting a sleeve onto the throttle valve cable adjacent to the distal end of the throttle valve cable, said sleeve having a length along its axis and defining an open axially aligned cavity; and mounting a spring with two ends over the throttle valve cable so that one end of the spring is adjacent to the sleeve and the other end of the spring is adjacent to the cable end fitting provided on the throttle valve cable.

2. The method for adjusting the shift performance of an automatic transmission of claim 1, wherein the spring is a coil spring with a spring force of between about 5 and 7 psi.

3. The method for adjusting the shift performance of an automatic transmission of claim 1, wherein the spring is a coil spring with a length between about 0.3 and 0.8 inches.

4. The method for adjusting the shift performance of an automatic transmission of claim 1, wherein the spring is a coil spring with an inner diameter and an outer diameter and the sleeve has a flange with an outer diameter greater than the outer diameter of the spring.

5. The method for adjusting the shift performance of an automatic transmission of claim 1, wherein the spring is a coil spring with a plurality of spring coils, each coil having an inner diameter and an outer diameter, and the sleeve has an outer surface with an outer annular ring having a diameter greater than the inner diameter of the spring coils so that when at least one of the spring coils is placed over the outer surface of the sleeve and on one side of the annular ring, and the other spring coils remain on the other side of the annular ring, the annular ring retards relative movement between the spring coils held at one side of the ring and the sleeve.

6. The method for adjusting the shift performance of an automatic transmission of claim 1, wherein the inner cavity of the sleeve comprises an open bore axially aligned with the open axially aligned channel such that the bore receives a cable clamp mounted on the distal end of the throttle valve cable when the sleeve is moved toward the distal end of the throttle valve cable.

7. The method for adjusting the shift performance of an automatic transmission of claim 1, wherein one end of the sleeve defines a recess that receives a portion of a barrel stop mounted at the distal end of the throttle valve cable.

8. The method for adjusting the shift performance of an automatic transmission of claim 1, wherein the sleeve defines a longitudinal slot cut through the sleeve along its length and terminating at the open axially aligned channel so that the sleeve may be mounted onto the throttle valve cable by inserting the cable first into the slot and then sliding the cable into the open axially aligned cavity.

* * * * *